United States Patent
Latham, II et al.

(10) Patent No.: US 8,866,463 B2
(45) Date of Patent: *Oct. 21, 2014

(54) NON-LINEAR PWM CONTROLLER

(71) Applicant: Maxim Integrated Products, Inc., San Jose, CA (US)

(72) Inventors: Paul W. Latham, II, Lee, NH (US); John C. Canfield, Lee, NH (US)

(73) Assignee: Maxim Integrated Products, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/750,564

(22) Filed: Jan. 25, 2013

(65) Prior Publication Data

US 2014/0035542 A1    Feb. 6, 2014

Related U.S. Application Data

(60) Division of application No. 12/194,404, filed on Aug. 19, 2008, now Pat. No. 8,395,365, which is a continuation-in-part of application No. 11/558,790, filed on Nov. 10, 2006, now Pat. No. 7,746,048.

(60) Provisional application No. 60/735,724, filed on Nov. 11, 2005.

(51) Int. Cl.
   *G05F 1/00* (2006.01)
   *H02M 3/158* (2006.01)
   *H02M 3/157* (2006.01)

(52) U.S. Cl.
   CPC ............. *H02M 3/158* (2013.01); *H02M 3/157* (2013.01)
   USPC ........................................................ 323/283

(58) Field of Classification Search
   USPC .......... 323/222, 271, 282, 283, 284, 285, 286
   See application file for complete search history.

(56) References Cited

U.S. PATENT DOCUMENTS

| | | | |
|---|---|---|---|
| 5,808,879 A | 9/1998 | Liu et al. | ........................ 363/17 |
| 5,969,515 A | 10/1999 | Oglesbee | |
| 6,400,127 B1 | 6/2002 | Giannopoulos | |

(Continued)

FOREIGN PATENT DOCUMENTS

WO    WO 2006/056918    6/2006    ........... H05B 41/288

OTHER PUBLICATIONS

U.S. Appl. No. 60/735,724, filed Nov. 11, 2005.

(Continued)

*Primary Examiner* — Nguyen Tran

(57) ABSTRACT

A switching power supply includes a circuit having at least two reactive components to provide an output voltage and capable of being switched from a first output state to a second output state. A switching component switches the circuit between at least two switching states including the first output state and the second output state. A pulse width modulator receives a duty cycle and drives the switching component to cause switching between two of the at least two switching states. A nonlinear controller component provides a duty cycle to the pulse width modulator. The duty cycle corresponds to at least one predetermined power supply state variable. The nonlinear controller component includes a processor to apply an optimization technique to minimize a predetermined function of the duty cycle and internal states of the power supply and to obtain a relationship between the duty cycle and at least one predetermined state variable.

19 Claims, 21 Drawing Sheets

(56) References Cited

U.S. PATENT DOCUMENTS

| | | | |
|---|---|---|---|
| 6,873,140 | B2 | 3/2005 | Saggini et al. |
| 6,906,931 | B1 | 6/2005 | Batarseh et al. ............... 363/17 |
| 6,940,733 | B2 | 9/2005 | Schie et al. ............... 363/21.12 |
| 6,979,987 | B2 | 12/2005 | Kernahan et al. |
| 6,992,469 | B1 | 1/2006 | King |
| 7,148,667 | B2 * | 12/2006 | Umemoto et al. ............ 323/282 |
| 7,358,706 | B2 | 4/2008 | Lys |
| 7,499,894 | B2 | 3/2009 | Marom et al. |
| 2004/0095020 | A1 | 5/2004 | Kernahan et al. ............... 307/35 |
| 2004/0104716 | A1 | 6/2004 | Marino et al. ............... 323/284 |
| 2005/0017702 | A1 | 1/2005 | Kernahan et al. ............ 323/282 |
| 2005/0086058 | A1 | 4/2005 | Lemelson et al. |
| 2005/0162144 | A1 | 7/2005 | Kernahan |
| 2005/0212501 | A1 | 9/2005 | Acatrinei |
| 2005/0285584 | A1 | 12/2005 | Kwan |
| 2006/0055388 | A1 | 3/2006 | Tang et al. ................... 323/284 |
| 2006/0061342 | A1 | 3/2006 | Bernacchia et al. .......... 323/282 |
| 2006/0152205 | A1 | 7/2006 | Tang et al. ................... 323/284 |
| 2007/0057654 | A1 | 3/2007 | Lee ............................... 323/271 |
| 2007/0063682 | A1 | 3/2007 | Dagher |
| 2007/0112443 | A1 | 5/2007 | Latham et al. .................. 700/29 |
| 2007/0236196 | A1 | 10/2007 | Vo ................................. 323/282 |

OTHER PUBLICATIONS

International Search Report dated Mar. 28, 2008 for PCT/US06/60793 filed Nov. 10, 2006. Applicant: L&L Engineering LLC.

Kelly, A. et al. Control of dc-dc converters by direct pole placement and adaptive feedforward gain adjustment. Applied Power Electronics Conference and Exposition, 2005. Twentieth Annual IEEE, vol. 3, Mar. 6-10, 2005, pp. 1970-1975.

Kelly, A. et al. High Resolution DPWM in a DC-DC Converter Application Using Digital Sigma-Delta Techniques. Power Electronics Specialists, 2005 IEEE 36th Conference on, Sep. 11-14, 2005, pp. 1458-1463.

Pun, L. Introduction to Optimization Practice, ISBN 471-70233-1, pp. 173-194, 1969.

De Russo, P.M. et al. State Variables for Engineers, John Wiley and Sons, New York, N.Y., 1965, pp. 575-577.

Mayne, D.Q. et al. Adaptive receding horizon control for constrained nonlinear systems, Proceedings of the 32nd IEEE Conference on Decision and Control, Date: Dec. 15-17, 1993, pp. 1286-1291, vol. 2.

Haykin, S. Introduction to Adaptive Filters, ISBN 0-02-949460-5, pp. 41-89, pp. 108-110, and pp. 139-143, 1984.

Bibian, Stephanie; Jin, Hua: High performance predictive Dead-Beat Digital Controller for DC Power Supplies:, IEEE Transaction on Power Electronics, vol. 17, No. 3, (May 3, 2002), pp. 420-427.

Patella, Benjamin and Al: "High-Frequency Digital PWM controller IC for DC-DC Converters", IEEE Transaction on Power Electronics, vol. 18, No. 1, (Jan. 1, 2001), pp. 438-446, Jan. 2003.

Kazmierkowski, M.P.; Dzieniakowski, M.A.: "Review of current regulation techniques for three-phas PWM inverters", Industrial Electronics, Control and Instrumentation, vol. 1, (Sep. 5, 1994)-(Sep. 9, 1994), pp. 567-575, DOI: 10.1109/IECON.1994.397839.

Nesic, D.; Mareels, I.M.Y.; Bastin, G.; Mahoney, R.: "Output Dead Beat Control for a Class of Planar Polynomial Systems", Siam Journal on Control and Optimization, vol. 36, No. 1, (Jan. 1, 1998), pp. 253-272, XP002609961, DOI: 10.1137/S0363012995286381.

* cited by examiner

NON-LINEAR PWM CONTROLLER

This application is a divisional of U.S. patent application Ser. No. 12/194,404, filed on Aug. 19, 2008, which is a continuation in part of U.S. patent application Ser. No. 11/558,790 (now U.S. Pat. No. 7,746,048), entitled "NON-LINEAR PWM CONTROLLER FOR DC TO DC CONVERTERS," filed on Nov. 10, 2006, which claims priority of U.S. Provisional Application 60/735,724 entitled "NON-LINEAR PWM CONTROLLER FOR DC TO DC CONVERTERS," filed on Nov. 11, 2005, all of which are incorporated by reference herein in their entirety.

FIELD

Background

These teachings relate to control of systems. In many systems of interest, the system output has a low pass frequency response. One example of such systems is a DC to DC converter. (Other examples include, but are not limited to, servo systems, automotive/aviation controls, disk drive memories, robotics, and NCC manufacturing machines.)

Switching converters, of which DC to DC converters are one variety, are used to efficiently transform voltage and current of one level to voltage and current of a different level. Switching converters are particularly important when either high power or battery operation requires high efficiency. Switching converters are pervasive throughout many consumer products. They are used in almost all everyday items such as cell phones, PDAs, personal computers, etc. A key feature of the DC to DC converters is its small size and low cost. This is achieved through efficient design.

DC to DC converters are used to convert an input DC voltage to an output DC voltage. Such converters may step down (buck) or step up (boost) the input DC voltage (buck-boost converters are also possible).

Conventional power supplies use Pulse Width Modulation (PWM) to control the power devices used in converters. To minimize the size of the output capacitors and improve the rejection of the output voltage to load current steps, it is desirable to have the feedback bandwidth in a DC-to-DC converter to be as large as possible. This is typically achieved by designing a linear compensated control loop with a large bandwidth. Unfortunately, one of the limitations that occurs with a normal pulse width modulated or PWM control system is that the duty cycle cannot be less than 0% and more than 100%. As a result, the control loop operates in its desired linear form for small disturbances. But for large disturbances the behavior is suboptimal and in some cases can even become unstable. The result of this is a deliberate reduction in the linear compensator bandwidth to accommodate the effect of finite control effort.

Other applications, notably small servo motors, are not as concerned with power efficiency. In these applications, linear amplifiers may be used instead of PWMs. Linear power amplifiers are limited by the amplitude of their outputs. This limitation is similar to the 0% and 100% PWM duty cycle limitations.

There is a need to provide a controller that can operate well for large disturbances.

SUMMARY

In one embodiment, the controller of these teachings includes a nonlinear controller component capable of providing an amplitude determining input signal to a control signal providing component, the control signal providing component providing output having a predetermined amplitude substantially over one time interval from a number of time intervals or an output having a predetermined average amplitude substantially over one time interval from a number of time intervals (as used herein, the phrase "output having a predetermined amplitude substantially over one time interval" refers to both an output having a predetermined amplitude and an output having a predetermined average amplitude), the amplitude determining input signal corresponding to at least one predetermined system state variable. The nonlinear controller component is operatively connected to receive as inputs at least one predetermined system state variable. A relationship between the amplitude determining input signal and at least one predetermined system state variable is obtained by a predetermined method.

Other embodiments of the controller of these teachings are also disclosed including embodiments in which at least some of the internal states of the system are estimated.

Embodiments of the apparatus of these teachings are also disclosed.

For a better understanding of the present invention, together with other and further needs thereof, reference is made to the accompanying drawings and detailed description and its scope will be pointed out in the appended claims.

DETAILED DESCRIPTION

Figure 1A:
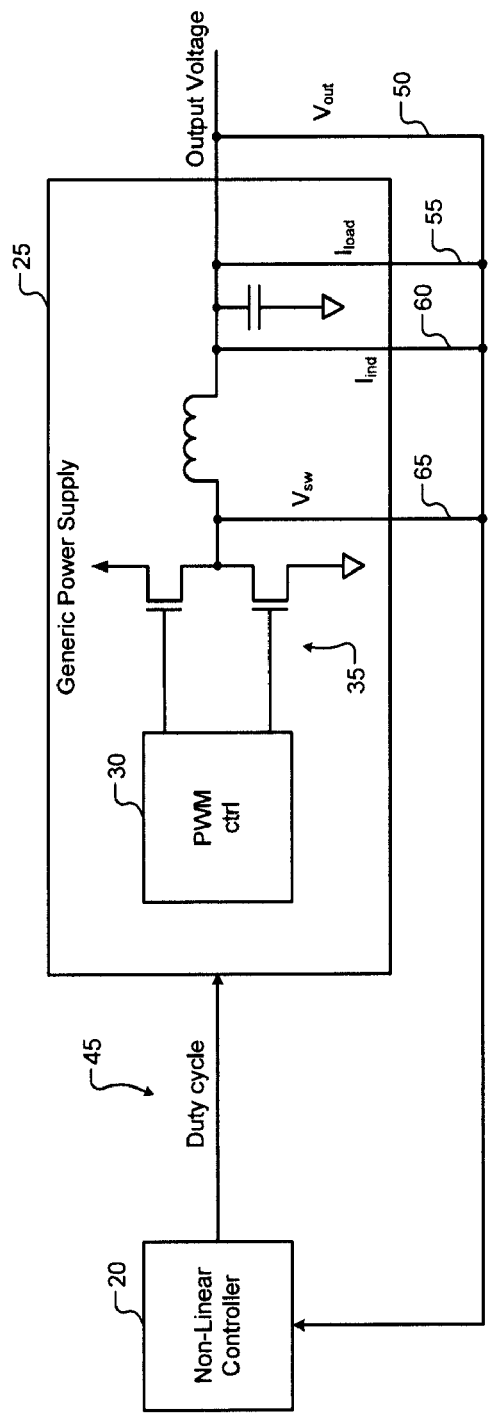
FIGS. 1a-1d show a graphical schematic representation of an embodiment of the nonlinear PWM controller of these teachings.

In one embodiment, the controller of these teachings includes a nonlinear controller component capable of providing an amplitude determining input signal to a control signal providing component, the control signal providing component providing output having a predetermined amplitude substantially over one time interval from a number of time intervals, the amplitude determining input signal corresponding to at least one predetermined system state variable. The nonlinear controller component is operatively connected to receive as inputs at least one predetermined system state variable. A relationship between the amplitude determining input signal and at least one predetermined system state variable is obtained by a predetermined method.

The present teachings can be applied to a variety of systems including, but not limited to, systems where the system output has a low pass frequency response. In the exemplary embodiment presented below, the system is a switching power converter, in particular a DC to DC converter. It should be noted that the present teachings are not limited to only this exemplary embodiment. While the load current is an output variable of interest in the DC to DC converter, it should be noted that the teachings illustrated in the exemplary embodiment disclosed below that relate to load current, such as estimation, can be applied to output variables of a system.

The nonlinear controller component of these teachings provides an amplitude determining signal (in one instance, a digital signal) as input to a control signal providing component. The control signal providing component provides output having a predetermined amplitude substantially over one time interval from a number of time intervals or, equivalently, an average predetermined amplitude substantially over one time interval from a number of time intervals. Hereinafter, the above equivalent representations of the output of the control signal providing component are described by the first representation. In one instance, the teachings relate to digitally encoding analog control signals. In the exemplary embodiments shown below, the control signal providing component is a pulse width modulator (PWM) and the amplitude determining signal is a duty cycle. In a PWM, an average predetermined amplitude results from providing a predetermined duty cycle. It should be noted that these teachings are not limited only to this exemplary embodiment. For example, another exemplary embodiment of the control signal providing component is a linear amplifier and a DAC and the output of that exemplary embodiment is shown in FIG. 1g.

One embodiment of the nonlinear controller of these teachings provides optimum response for both large and small load disturbances. In one instance, an embodiment of the system utilizes dynamic programming (see, for example, L. Pun, Introduction to Optimization Practice, ISBN 471-70233-1, pp. 173-194 and De Russo, Roy, Close, State Variables for Engineers, John Wiley and Sons, New York, N.Y., 1965, pp. 575-577, both of which are incorporated by reference herein). It should be noted that these teachings are not limited to the use of dynamic programming. A variety of optimization techniques can also be utilized. For example, one technique which can be used is based on model predictive control; another is derived from techniques used for generalized optimization problems, such as genetic programming, simulated annealing, exhaustive numerical search, and neural networks, among others. With model predictive control, the controller starts at its current location and figures out the optimum trajectory up to some future time (see, for example, Mayne, D. Q.; Michalska, H, Adaptive receding horizon control for constrained nonlinear systems, Proceedings of the 32nd IEEE Conference on Decision and Control, 1993, Date: 15-17 Dec. 1993, Pages: 1286-1291 vol. 2, which is incorporated by reference herein). Using that trajectory, the system state at the next time step is computed, and the process is repeated for every time step until the final time is reached.

In most optimization techniques, the optimization can be carried out subject to constraints. A number of practical constraints arise in the control and operation of switching power supplies. For example, constraints of maximum current and output voltage tolerance arise in operation or design.

In one embodiment, one element of these teachings is the realization that the plant dynamics for switching (DC-to-DC) converters designed for high speed application have a very short transient time, an inherently discreet time, and are typically only second order. These observations, taken together, allow dynamic programming to be applied to PWM switching converters.

In one embodiment, the dynamic programming technique can provide the optimum duty cycle at every point in time. This is done by working backwards in time from the equilibrium point and at each step determining the best possible trajectory to reach the equilibrium point.

FIG. 1a shows an embodiment of the nonlinear PWM controller of these teachings. The switch and output voltages, combined with the inductor current and load current, are used to determine the correct duty cycle. The form of the nonlinear controller can be as simple as a lookup table or as complex as calculations done with the DSP. One exemplary analog embodiment includes a piece wise linear approximation using comparators. In another embodiment, the function providing the duty cycle from the state variables (the capacitor voltage and the inductor current in the exemplary embodiment shown in FIG. 1a) is represented by a polynomial function of the state variables, as shown in FIG. 1h. In one exemplary embodiment, these teachings not being limited to only that exemplary embodiment, the duty cycle is given by $$Kv^*Vc + Kv2^*Vc^2 + Kv3^*Vc^3 + Ki^*\text{ind} + Ki2^*\text{ind}^2 + Ki3^*\text{ind}^3$$

In another exemplary embodiment, these teachings not being limited to only that exemplary embodiment, the duty cycle is given by $$Kv^*Vc + Kv2^*\text{sign}(Vc)^*Vc^2 + Kv3^*Vc^3 + Ki^*\text{ind} + Ki2^*\text{sign}(\text{ind})^*\text{ind}^2 + Ki3^*\text{ind}^3.$$

In another exemplary embodiment, these teachings not being limited to only that exemplary embodiment, the duty cycle is limited to the maximum control effort. In that embodiment the duty cycle is given by $$Kv^*Vc + Kv2^*\text{sign}(Vc)^*Vc^2 + Kv3^*Vc^3 + Ki^*\text{ind} + Ki2^*\text{sign}(\text{ind})^*\text{ind}^2 + Ki3^*\text{ind}^3.$$

If the value of the expression is greater or equal to zero and is less than or equal to 100% duty cycle, then the duty cycle is assigned the value of the expression. If the value of the expression is less than zero, the duty cycle is assigned to zero. If the value of the expression is greater than 100%, the duty cycle is assigned to 100%. (Hereafter, the term polynomial expression includes the exemplary embodiment utilizing a polynomial expression and limits on the maximum and/or minimum value.)

Figure 2A:
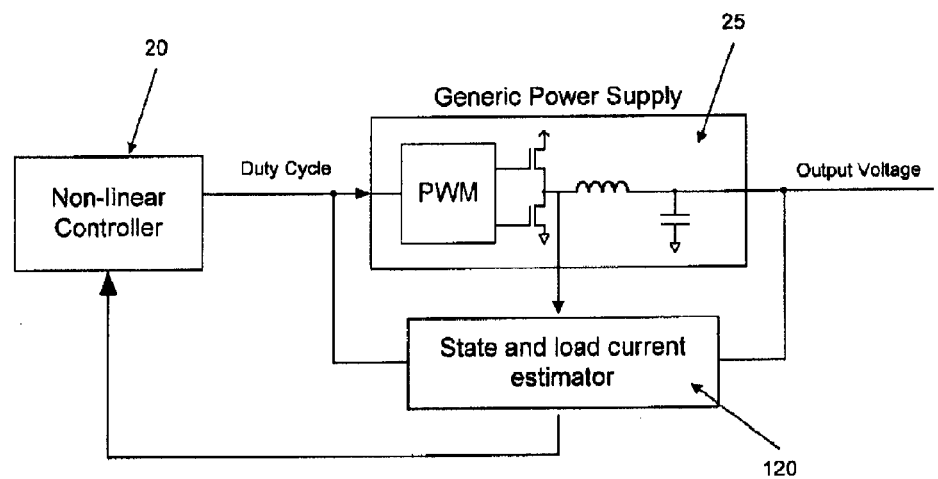
FIGS. 2a-2e show graphical schematic representations of embodiments of the controller of these teachings including a state estimator.

In many applications it may not be desirable to have direct measurement of all these parameters, for example inductor and load currents. Instead it is desirable to use a load current estimator (see US patent application publication 2007-0112443-A1, corresponding to U.S. patent application Ser. No. 11/553,917, both of which are hereby incorporated by reference in their entirety), to determine the missing state information. FIG. 2a is a pictorial representation of such a system. With this embodiment, the estimator is a dynamic system and the nonlinear controller is still just a static function of the measurements and estimates.

The proposed state estimator is designed (by traditional techniques, such as, but not limited to, least squares estimators, Bayesian estimators or by the techniques described in U.S. patent publication 2007-0112443 A1, corresponding to U.S. patent application Ser. No. 11/553,917, both of which are hereby incorporated by reference) with augmented states to estimate load current as well. An embodiment of the system of these teachings including a state estimator 120 is shown in FIG. 2a.

In some embodiments, the (adaptive in one embodiment) plant estimator component 120 utilizes the LMS algorithm in order to provide an estimate of the state variables of the switching power supply 25. (For a description of the LMS algorithm, see, for example, S. Haykin, Introduction to Adaptive Filters, ISBN 0-02-949460-5, pp. 108-110, which is incorporated by reference herein.). In other embodiments, the (adaptive) plant estimator component 120 utilizes an RLS algorithm (for a description of the RLS algorithm, see, for example, S. Haykin, Introduction to Adaptive Filters, ISBN 0-02-949460-5, pp. 139-143, which is incorporated by reference herein).

As disclosed in U.S. patent application Ser. No. 11/553,917, in one embodiment, the controller of these teachings, includes a sampling component capable of sampling an output signal from a system and an input signal from the system at a first sampling rate, the first sampling rate being at least equal to a predetermined operating rate, an input parameter obtaining component capable of receiving the output signal and the input signal sampled at the first sampling rate and of obtaining values for a plurality of input parameters, the values for the input parameters being sampled at the first sampling rate, a decimator component capable of receiving the values for the input parameters sampled at the first sampling rate and of providing subsampled values for the input parameters, the subsampled values being sampled at a second sampling rate, the second sampling rate being slower than the first sampling rate, an adaptive plant estimator component capable of receiving the subsampled values of the input parameters and of obtaining a model of the system, the model reflecting variations in the system.

As disclosed in U.S. patent application Ser. No. 11/553,917, in another embodiment, the method of these teachings includes sampling an output signal from a system and an input signal from the system, obtaining, from the sampled output signal and the sampled input signal, values for a predetermined finite number of rows and columns from an inverse matrix and a predetermined finite number for a row vector in a least-squares solution, and obtaining, from the values for the predetermined finite number of rows and columns from an inverse matrix and the predetermined finite number for a row vector in a least-squares solution, a model for the system. Once a model of the system is obtained, an adaptive control method can be implemented.

Figure 2B:
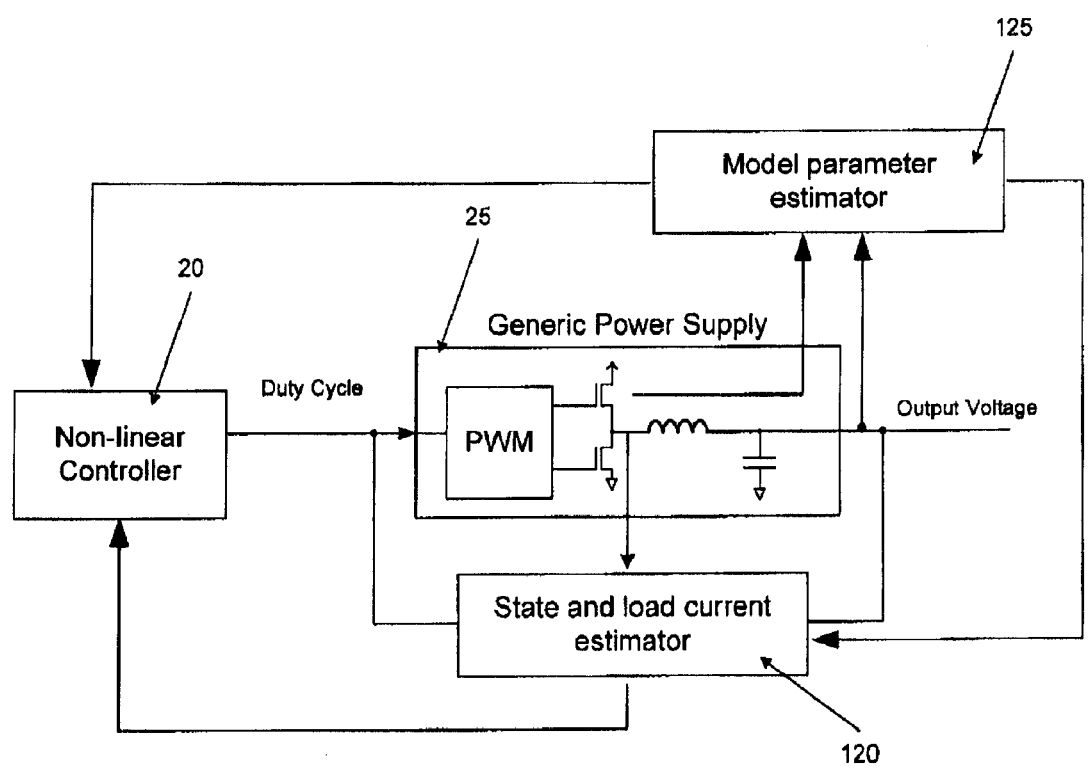

In one instance, shown in FIG. 2b, the model parameters could be estimated, by a model parameter estimator 125, along with the state and load current estimator 120.

As disclosed in U.S. patent application Ser. No. 11/553,917, in one exemplary embodiment, these teachings not being limited to that exemplary embodiment, parameters of the system 25 (DC-to-DC power supply) vary slowly. Therefore it is possible to make the parameter updates using a slower, offline computation. In a state estimator design, an analog-to-digital converter (ADC) measures the output and input (and intermediate in some embodiments) voltages in the power supply 25. The ADC results are also used by auto- and cross-correlators to measure the behavior of the power supply 25. The parameter computations are done offline at a lower sampling rate. This lowers the cost of those tasks, because the digital logic can be in the form of a simple micro-sequencer.

Figure 2C:
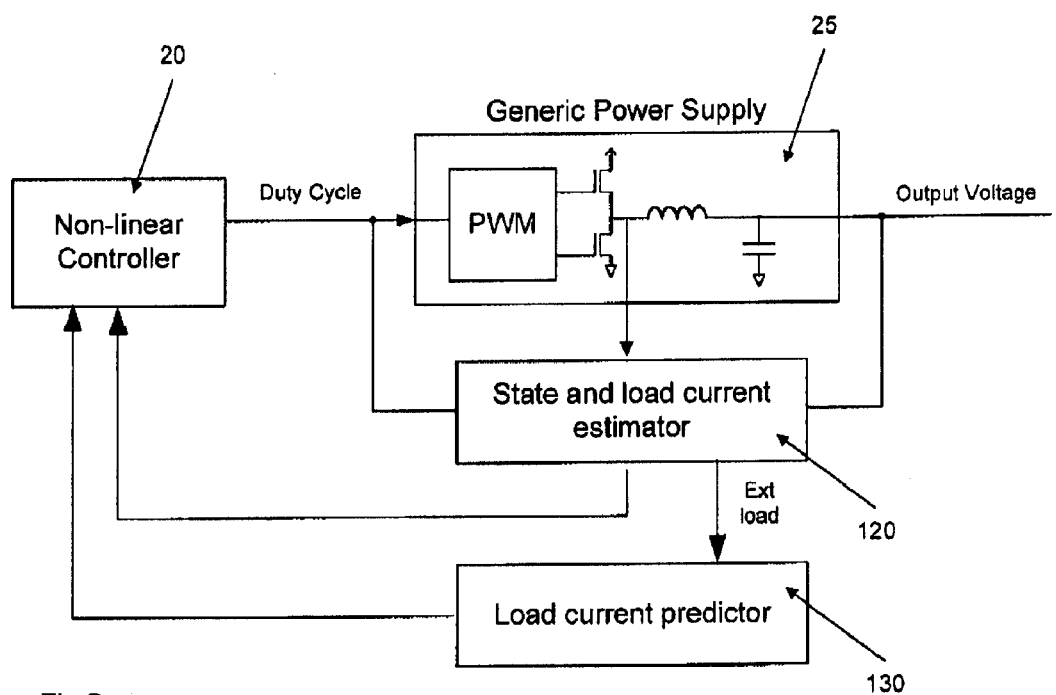

In another embodiment, shown in FIG. 2c, the controller of these teachings also includes a load current estimating component 120. As disclosed in U.S. patent application Ser. No. 11/553,917, in one embodiment, the load current estimating component is capable of receiving the output signal sampled at the first sampling rate and state estimation data from the (adaptive) plant estimator component and of providing estimated load current data at a first sampling rate and another decimator component capable of receiving the estimated load current data at the first sampling rate and of providing estimated load current data at the predetermined operating rate to the non-linear controller 20.

In one instance, as disclosed in U.S. patent application Ser. No. 11/553,917, the ADC is an oversampling ADC, a Delta Sigma ADC in one embodiment, including an oversampling modulator, delta-sigma modulator in the above embodiment, and a decimation filter. The oversampling modulator converts the analog input voltage into a high-speed, digital bit stream. The digital bit stream may be as little as one bit wide. Because the digital bit stream is sampled at a very high rate, it is possible to low-pass filter the bit stream and to recover a high-precision, lower-sample-rate representation of the analog signal.

In one embodiment, the sampling component is an oversampling (sigma delta in one embodiment) modulator and the first sampling rate is an oversampled rate. In one embodiment, the input parameter obtaining component is an autocorrelation and crosscorrelation estimator. It should be noted that other embodiments of the input parameter obtaining component are possible and within the scope of these teachings. It should also be noted that embodiments are possible in which the oversampling (sigma delta in one embodiment) modulator provides inputs to the state estimator and the load estimator.

In many applications, including the DC-to-DC converter application, and in particular for embodiments utilizing the cross- and autocorrelation functions, the decimation filter (decimator) function can be built-in. This reduces the cost because a one-bit multiplier is just a single gate, while a high-precision digital multiplier can be a costly design.

It should be noted that, although the embodiments shown above have not been explicitly adaptive, adaptive embodiments of the non-linear controller are possible and within the scope of these teachings. For example, once the states are estimated, as in FIGS. 2a and 2b, the cost function can be adapted to the identified states and the nonlinear controller can be an adaptive nonlinear controller. In the embodiment shown in FIG. 2e, the memory used is not a ROM but instead a RAM, which is altered by an adaptive component.

In another embodiment, correction logic is used to include the information gained from state estimation. The correction logic adjusts the RAM contents by measuring the error from the prediction of the current state based on the last state and the real measurement of the current state.

In another embodiment, shown in FIG. 2c, the future load is predicted from the trends in the past load current by means of a load current predictor 130. This type of prediction can be done, in one instance, by a FIR or finite impulse response filter and, in another instance, by an infinite impulse response filter (or IIR filter). The filter coefficients could be determined, in one instance, by an LMS like algorithm and, in another instance, by an RLS like algorithm. It should be noted that these teachings are not limited to only those two algorithms. Other algorithms, such as, but not limited to, neural networks, can also be used for prediction. (See, for example, S. Haykin, Introduction to Adaptive Filters, ISBN 0-02-949460-5, pp. 41-89, which is incorporated by reference herein.)

Figure 2D:
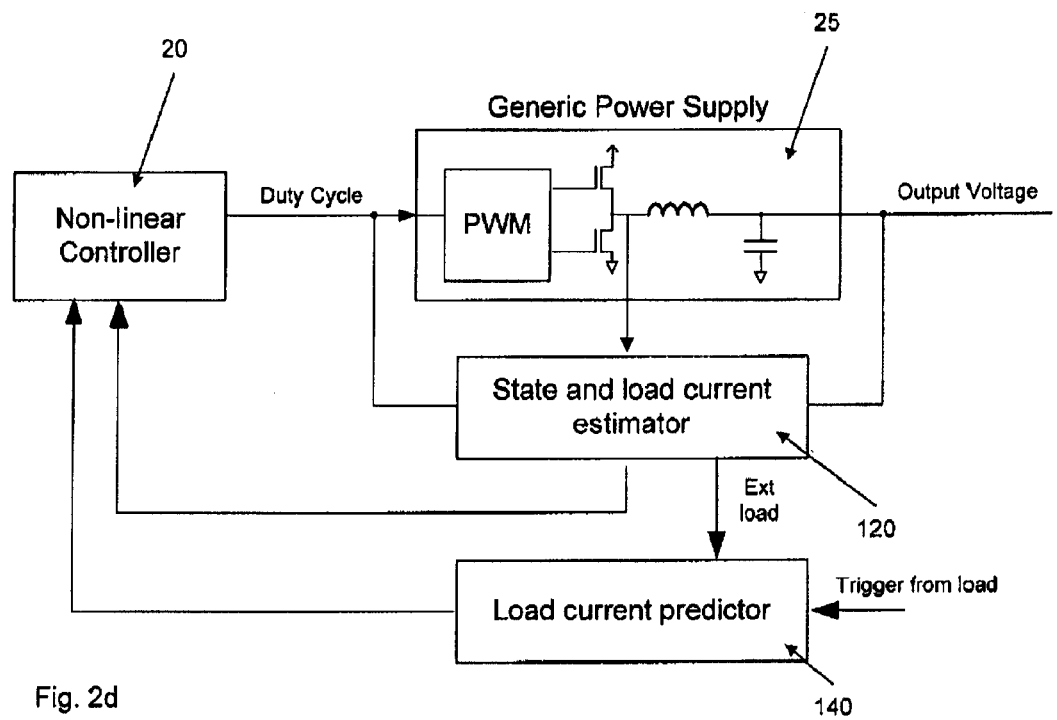
Figure 2E:
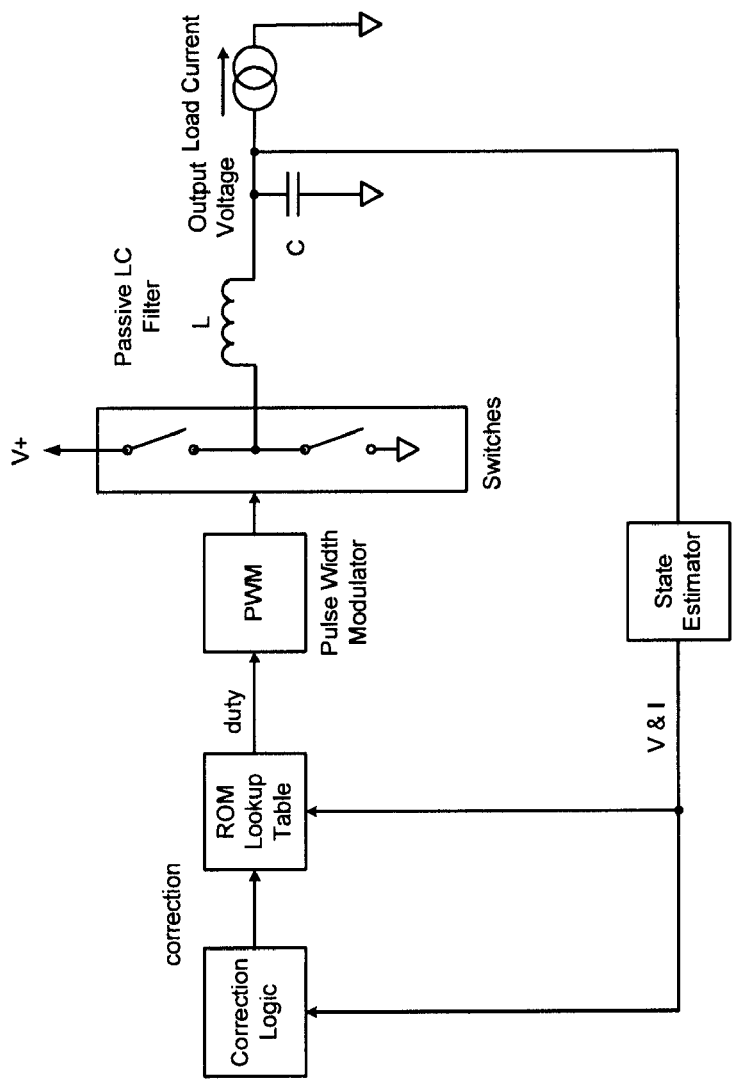
Figure 3:
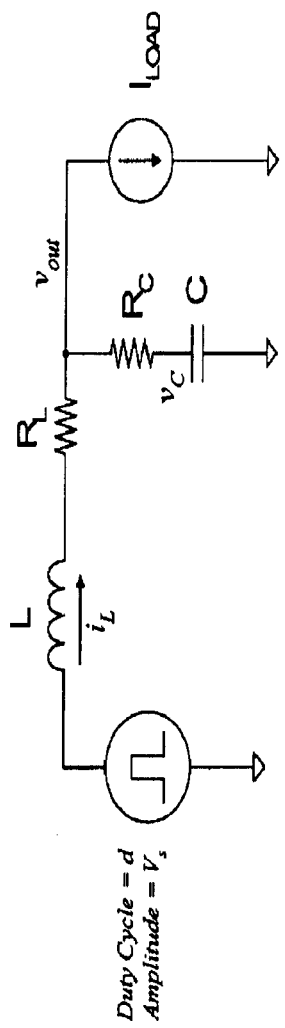
FIG. 3 shows a model of the buck regulator used in deriving one embodiment of the system of these teachings.

In another instance, as shown in FIG. 2d, information indicating that the load is about to have an abrupt change can be obtained. This input could be processed by a load curve predictor 140a. In one embodiment, the load current predictor is a nonlinear lookup table. In another embodiment, techniques such as those described by John Canfield, Ph.D.'s thesis, Electrical Engineering, U.N.H, 2003, which is hereby incorporated by reference, are used. A nonlinear lookup table technique such as the cerrebular model articulation controller (CMAC) is used in one embodiment.

An exemplary embodiment is described below in order to better illustrate the system of these teachings. The exemplary embodiment uses a buck converter topology. However the methods of these teachings are applicable to any generic converter of buck, boost, or buck-boost, forward, fly-back, SEPIC, cuk, etc. type.

In one embodiment, the resultant control law is implemented as a state-space static compensator described by a lookup table. This result provides a better understanding of the nature of the optimal control surface (e.g., degree of nonlinearity, area of the map that is saturated) which is important in order to understand the representation requirements of an optimal compensator implementation.

In another embodiment, the resultant control law is implemented as a compensator described by a polynomial function of the state variables. In one instance, the coefficients of the polynomial function of the state variables are stored in a memory (similar to a lookup table). In other instances, a dedicated component receives the state variable values and implements the computation of the polynomial function.

The embodiment of the time-optimal compensator of these teachings derived below is based on the model of the buck regulator shown in FIG. 1a. It should be noted that this is not a limitation of these teachings and other regulators are within the scope of these teachings. The model is comprised of a linear LC filter which includes the effects of inductor and capacitor series resistances. It is important to note that the model could be easily extended to include other nonlinear effects (e.g., inductor saturation) and still be used directly in the design process described below.

Referring to FIG. 1a, a nonlinear controller 20 provides a duty cycle 45 to a pulse width modulator (PWM) 30. The nonlinear controller 20 receives as inputs the output from a switching power supply 25 and a number of switching power supply internal state variables, for example, in the embodiment shown in FIG. 1a, the voltage at the inputs to the circuit including the two or more reactive components 65, Vsw, the current through the inductor 60, the load current 55 and the output voltage 50.

Figure 1B:
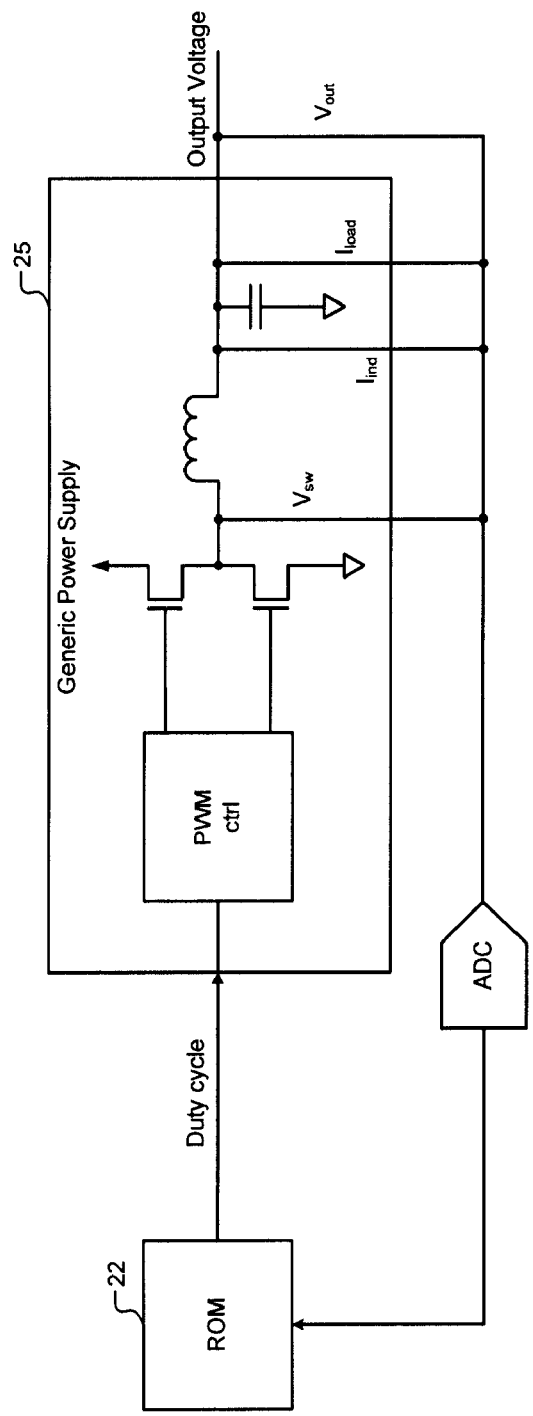
Figure 1C:
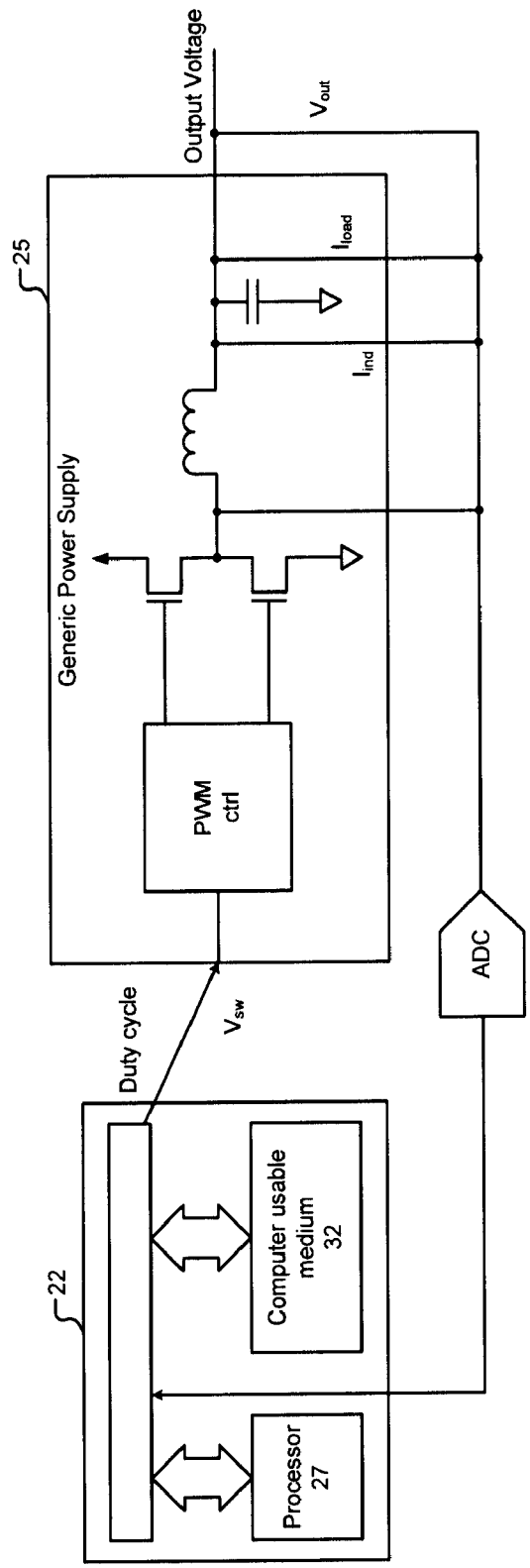
Figure 1D:
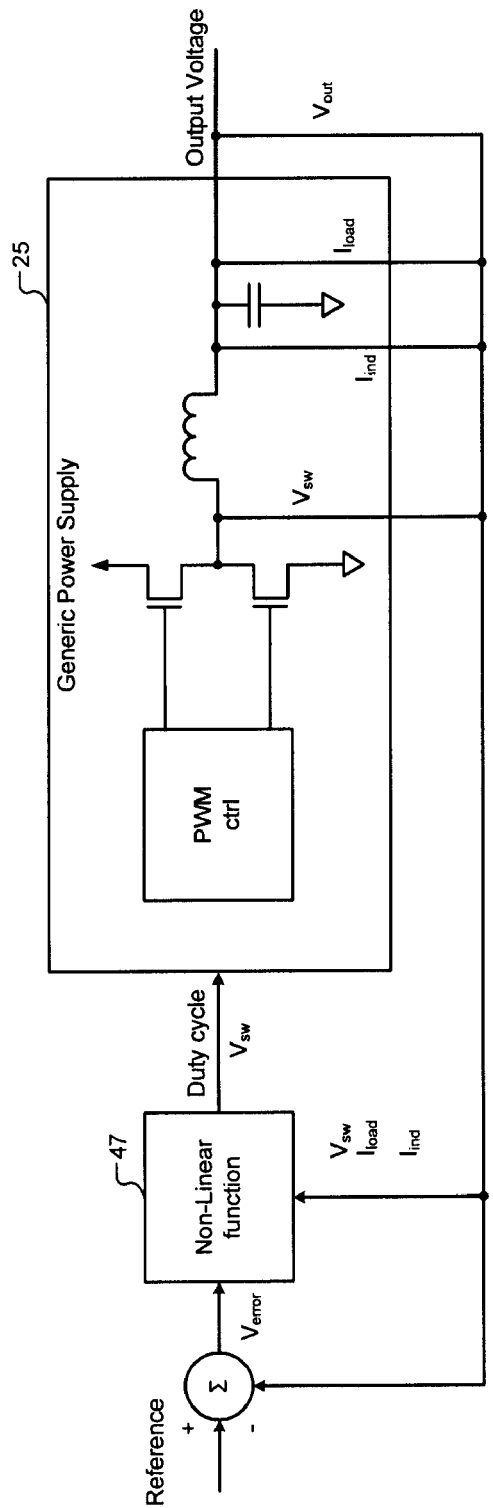

FIG. 1b depicts the embodiment in which the nonlinear controller is implemented as a memory 22 (a ROM in the instance shown). The memory is used to implement a lookup table (a data structure stored in said memory), the data structure including a number of duty cycles, each duty cycle having one or more corresponding predetermined switching power supply state variables; each duty cycle, when provided to the PWM of the switching power supply, enables obtaining a predetermined switching power supply output.

Figure 1E:
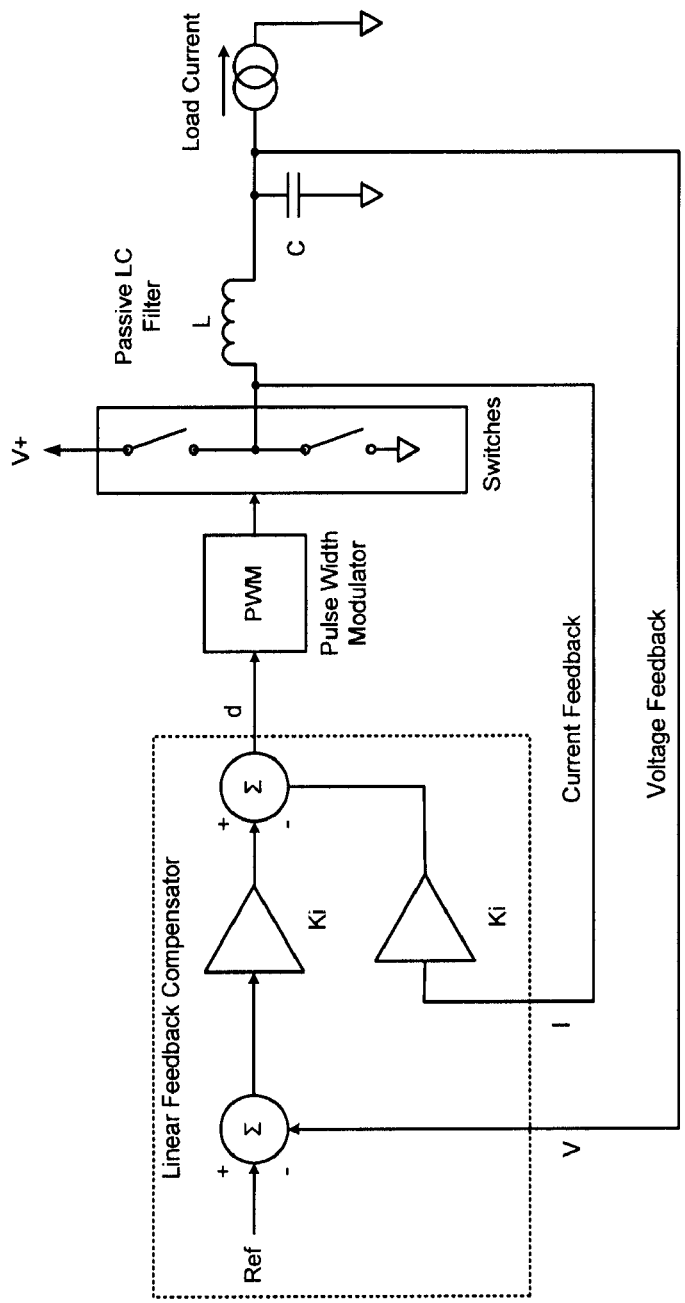
FIGS. 1e and 1f are block diagrams depicting the conventional linear buck controller in ROM form.

To aid in better understanding the embodiment of the system of these teachings shown in FIG. 1b, an embodiment of a conventional linear controller is shown in FIG. 1e. A conventional linear controller for a buck converter consists of feeding back an error signal that is composed of two components, as shown in FIG. 1e. The first component is a linear gain multiplied by the difference between the desired output voltage minus the measured output voltage. The second component is a gain multiplied by the inductor current. These two components are added together to form the duty cycle input to a pulse width modulator, PWM. As an alternative, the derivative of the output voltage could be used instead of the inductor current. The voltage feedback provides the correct regulation set point. The voltage feedback forces the output voltage toward the same value as a reference voltage. The current or voltage derivative feedback is used to stabilize the loop by adding phase lead to the feedback loop. In this way, the voltage gain can be larger while maintaining closed loop stability.

The equation that represents this linear feedback controller is simply:

$$d = Kv(\text{Ref}-V) - KiI$$

Figure 1F:
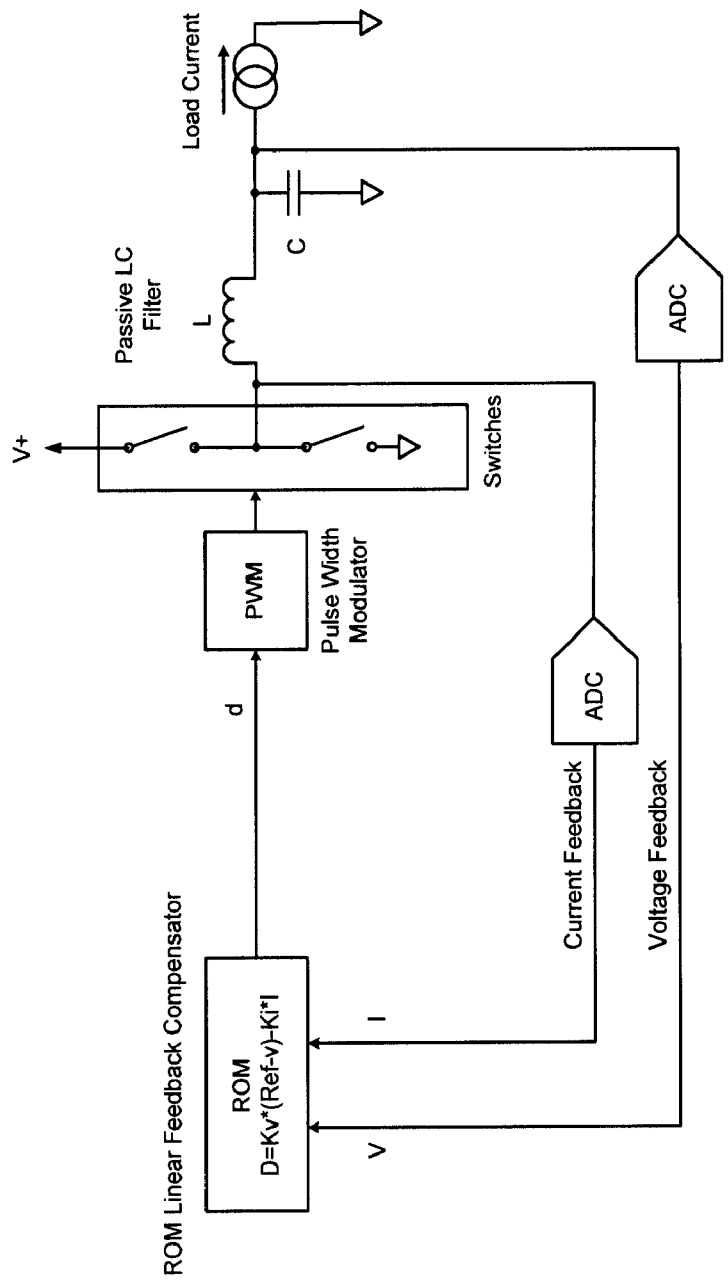
Figure 1G:
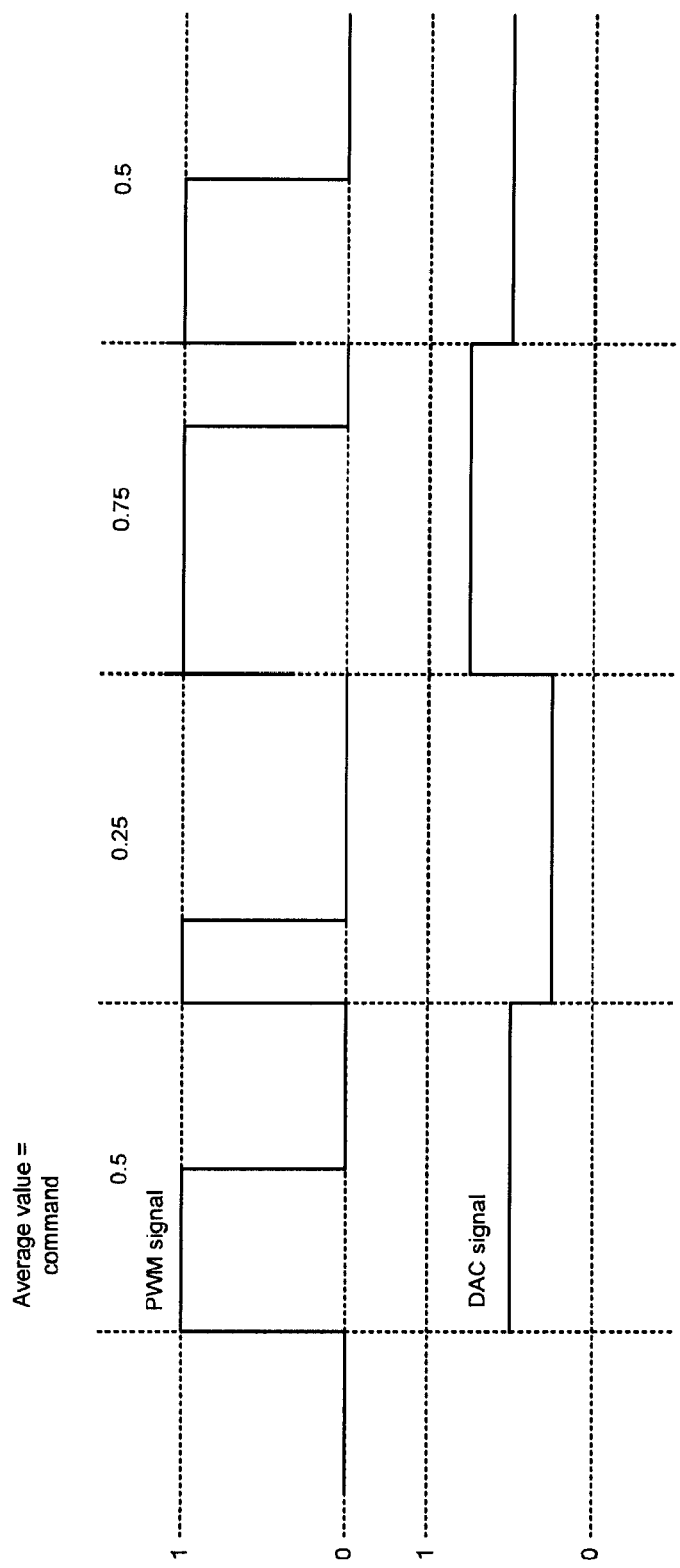
FIG. 1g is a graphical representation of output signals from the embodiment of the control signal providing component comprising a linear amplifier and a DAC.
Figure 1H:
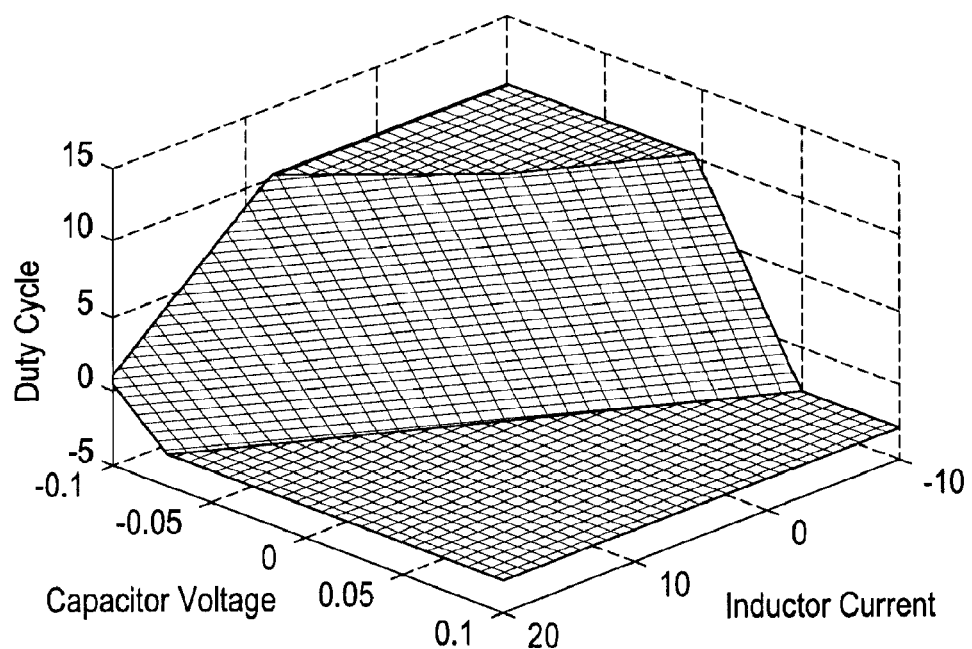
FIG. 1h is a graphical representation of an embodiment of a function relating the amplitude determining signal (duty cycle) to the state variables (capacitor voltage, inductor current)

Where
d is the duty cycle command of the PWM
V is the voltage feedback
I is the current feedback
Ref is the reference voltage
Kv is the voltage gain
Ki is the current feedback Instead of implementing this equation as an algebraic relationship, a read only memory, ROM, lookup table could be used, as shown in FIG. 1f. The analog representation of the voltage and current are converted to a digital representation by an analog to digital converter, ADC. The digital representation of the current and voltage is used to form the address to the memory. The output of the memory is used to control a digital PWM or a DAC driving a traditional analog PWM.

FIG. 1c depicts the embodiment in which the nonlinear controller is implemented as one or more processors 27 and one or more computer-usable media 32 having computer-readable code embodied therein that causes the processors 27 to obtain a duty cycle as described above. The processor 27, the one or more computer-usable media 32 and the inputs are operatively connected by means of an interconnection component (such as a computer bus). In one instance, the one or more processors 27 and the one or more computer-usable media 32 are part of a DSP.

FIG. 1d depicts the embodiment in which the nonlinear controller is implemented as a piece wise linear approximation using a non-linear analog circuit 47 to determine the duty cycle. For methods of implementing non-linear analog circuits see, for example, Danial H. Sheingold, Nonlinear Circuit Handbook, published by Analog Devices, Inc., Norwood, Mass., chapter 2 and, Dualibe, Carlos, Verleysen, M., Jespers, P, Design of Analog Fuzzy Logic Controllers in CMOS Technologies Implementation, Test and Application, ISBN-10: 1-4020-7359-3, both of which are incorporated by reference herein).

The equations describing this model can be easily formulated as a coupled set of linear differential equations. In state-space formulation these are given in equations (1) and (2). Notice that, in conventional systems, it is customary to derive a simplified set of operational equations by assuming that Vout is constant across each PWM cycle.

$$\frac{d}{dt}\begin{bmatrix} i_L(t) \\ v_C(t) \end{bmatrix} = \begin{bmatrix} -\frac{R_L+R_C}{L} & -\frac{1}{L} \\ \frac{1}{C} & 0 \end{bmatrix}\begin{bmatrix} i_L(t) \\ v_C(t) \end{bmatrix} + \begin{bmatrix} \frac{1}{L} & \frac{R_C}{L} \\ 0 & \frac{1}{C} \end{bmatrix}\begin{bmatrix} i_L(t) \\ v_C(t) \end{bmatrix} = \quad (1)$$

$$Ax(t) + Bu(t)$$

-continued $$\begin{bmatrix} i_L(t) \\ v_C(t) \end{bmatrix} = \begin{bmatrix} 1 & 0 \\ R_C & 1 \end{bmatrix} \begin{bmatrix} i_L(t) \\ v_C(t) \end{bmatrix} + [0] \begin{bmatrix} i_L(t) \\ v_C(t) \end{bmatrix} = Cx(t) \quad (2)$$

Considering a single PWM cycle, the state equations can be written as shown in equations (3) and (4) where the state-space trajectory is given by the sum of the natural exponential response and the convolution of the state transition matrix and the input vector.

$$\begin{bmatrix} i_L(t_0 + t) \\ v_C(t_0 + T) \end{bmatrix} = e^{AT} \begin{bmatrix} i_L(t_0) \\ v_C(t_0) \end{bmatrix} + \int_{t_0}^{t_0+T} e^{A(t-t_0)} Bu(t) dt \quad (3)$$

$$u(t) = \begin{bmatrix} V_s(u(t_0) + u(dt)) \\ I_{out}(t) \end{bmatrix} \quad (4)$$

The fundamental significance of this result is that it provides a means of predicting the state variables (inductor current and output voltage) at the end of the PWM cycle as a function of the initial state variables, the duty cycle, and the fixed parameters as given by equation (5). Two techniques for solving equation (5) numerically have been utilized. However, it should be noted that these teachings are not limited to only these two techniques. In one instance, the solution is found via numerical integration of equations (3) and (4). Alternatively, in another instance, one can create an equivalent discrete time system with a sample time equivalent to the PWM rate which is valid for a given duty cycle command. The discrete time model can then be used to predict the state variables at the end of the PWM cycle. The numerical integration technique was computationally more efficient but both methods yielded identical results.

$$\begin{bmatrix} i_L(t_0 + t) \\ v_C(t_0 + T) \end{bmatrix} = f(i_L(t_0), v_c(t_0), R_c, R_L, V_s, I_{out}, C, L, d) \quad (5)$$

The exemplary embodiment shown below utilizes dynamic programming. (However, it should be noted that these teachings are not limited to only this exemplary embodiment.) Dynamic programming is an optimization technique based on the Bellman Optimality Principle which, in essence, states that the optimal path from any intermediate state to some final state is independent of the control decisions which occurred prior to entering the intermediate state. The practical significance of the Bellman Principle is that it allows one to work backwards in time to consider the optimal path to the final state. This results in a drastic reduction in required computation. The dynamic programming task as implemented here can be divided into the following four steps:

Quantization of State-space and Control Input
Construction of State Transition Map
Construction of Global Cost Function
Derivation of Optimal Control Surface In order to implement a dynamic programming solution, it is necessary to quantize the state-space and control variables in both amplitude and time. The time quantization is selected to coincide with the PWM cycle.

The State Transition Map is a three dimensional mapping as defined by the solution to equation (5). The state transition map predicts the next quantized state as a function of the previous quantized state for all permissible duty cycle commands. Thus, the state transition map is a lookup table with dimensions Ni×Nv×Nd. The state transition map is computed by exhaustively filling the table based on numerical solution of equation (5). Values of commanded duty cycle which result in a next state outside the bounds of the defined state-space are marked as illegal controls for that state.

The Global Cost Function is a scalar valued function defined over the state-space. It provides the "cost" to transition from that state to the final target state (this is often referred to as the "cost-to-go"). In order to determine the global cost function it is necessary to provide a local cost function which appropriately penalizes each transition based on a function of the state and control input as shown in equation (6) where x(k) represents the state vector and u(k) represents the input vector.

$$J(x_0) = \sum_{k=0}^{M} L(u(k), x(k)) + \phi(N, x_N) \quad (6)$$

In the embodiment described below, the cost function defined in equation (7) is used. The primary weighting provided by this cost function is on the number of steps taken to reach the desired target state. This corresponds to the time-optimal control and is represented in the cost function as the path cost M. There is an additional weighting placed on the error in the voltage state variable. The parameter $\alpha$ is chosen such that the voltage error weighting is much less than 1.0 for any location in state-space. This choice of parameter results in a primary weighting based on the number of steps in the trajectory, and a tie-breaking secondary weighting based on the voltage error. For example, if there are two paths that result in a total trajectory containing an equal number of steps, the voltage error weighting will result in the one with a smaller voltage excursion being chosen as the overall optimal path. However, a suboptimal time path will never be chosen to reduce the voltage excursion.

$$J(\hat{v}_0, \hat{i}_L) = \alpha \sum_{k=0}^{M} (v_0[k] - v_{target})^2 + M \quad (7)$$

The global cost function is represented with the syntax given in equation (7) where M represents the number of time steps in the optimal path beginning at state $(\hat{v}_0, \hat{i}_L)$. The global cost function represents the total cost associated with beginning at state $(\hat{v}_0, \hat{i}_L)$ and ending in the target state. The global cost function is computed using the state transition map, the cost function (7) and the Bellman Principle according to the following algorithm:

Initialize the Global Cost Function by letting $J(\hat{v}_{target}, \hat{i}_{target})=0$ and $J(\hat{v}_0, \hat{i}_L)=\infty$ for all other points in the quantized state-space. That is, there is zero error associated with being in the target state and all other points are initialized to an infinite cost.

For each discrete point $(\hat{v}_0, \hat{i}_L)$ in the state-space:

2a. For each possible control input di (quantized duty cycle):
  2a'. Determine the next state $(\hat{v}_{0n}, \hat{i}_{Ln})$ from the state transition map
  2a". Determine the experimental cost $J_i = J(\hat{v}_0, \hat{i}_L) + (\hat{v}_0 - v_{target})^2$
2b. Let $J(\hat{v}_0, \hat{i}_L) = \min_i J_i$
2c. Let $\cup_{opt}(\hat{v}_0, \hat{i}_L) = d_{min}$ 3. If any values in the Global Cost Function changed value then repeat step 2.

Figure 4:
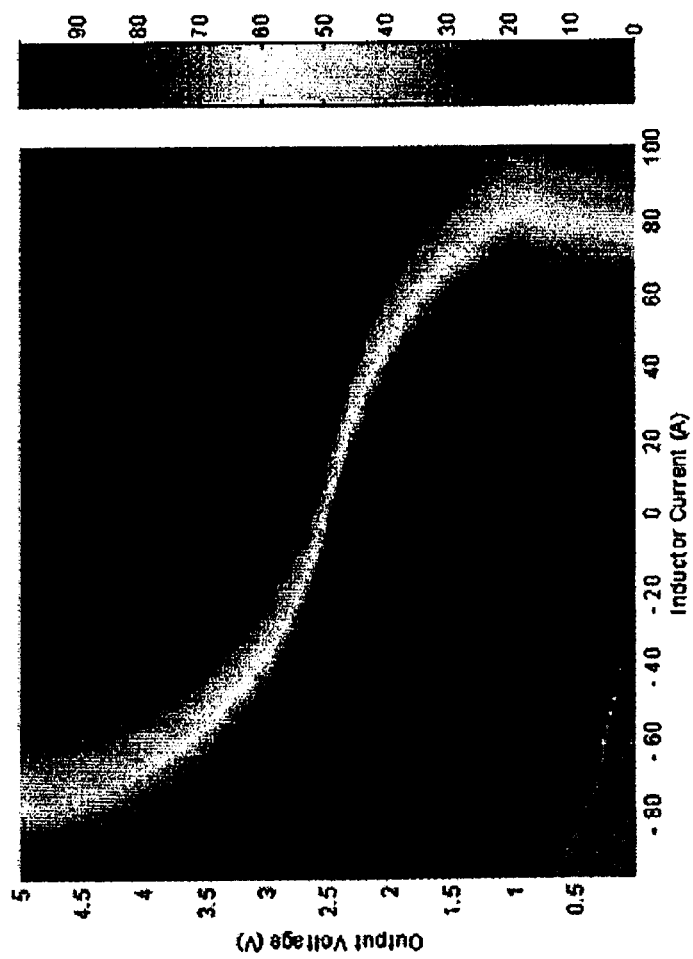
FIG. 4 depicts an optimal control surface over the state-space for an embodiment of the controller of these teachings.

FIG. 4 depicts the above derived optimal control surface over the state-space. In this case, the state-space was quantized to 200 levels in each variable and the duty cycle was quantized to 100 levels. The target voltage and current were chosen to be 2.5V and 10 A respectively. Notice that over most of the state-space, the optimal control is saturated near full or zero duty cycle and only assumes intermediate values over a small transition band. This transition band corresponds to the switching curve of a time-optimal controller. The region of low duty cycles in the lower left hand corner is due to the fact that these are unreachable states and in reality, these should be arbitrarily set to be full duty cycles. Also, the map shown here was filtered using a two-dimensional, nonlinear median filter. The edge effects of this filtering create artifacts that are visible along the boundaries of the image.

Figure 5:
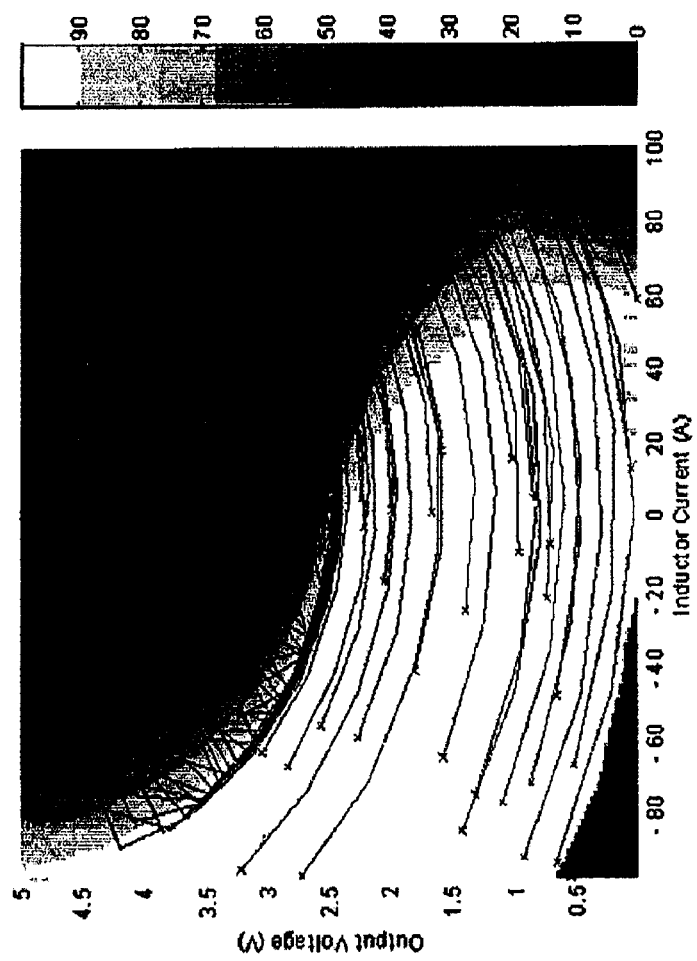
FIG. 5 depicts the optimal control surface of an embodiment of the controller of these teachings as a gray-scale image mapped over state-space.

It is informative to compare this optimal control surface with a time optimal control surface for a continuous-state, continuous-time plant. In that case, it is known that the optimal control is always saturated at its extremes and the controller can be completely described by switching curves which partition the state-space into regions of maximum control effort and minimum control effort (commonly referred to as "bang-bang" control). In this case, the time optimal solution contains intermediate controls along the pseudo-switching curve. The reason for this is due to the time quantization involved in the PWM problem. The time-optimal bang-bang control is only the optimal solution if the switching times are allowed to be arbitrary. In the case of a PWM controller, only control decisions at the PWM interval boundaries can be made. Therefore, when the state is close to the final state, the optimal control assumes the appropriate intermediate value to accommodate the time quantization. FIG. 5 depicts the optimal control surface as a gray-scale image mapped over state-space. The duty cycle is in percentage from 0 to 100%. Overlaid on the image are a series of 100 optimal trajectories beginning at random initial conditions in state-space.

Figure 6:
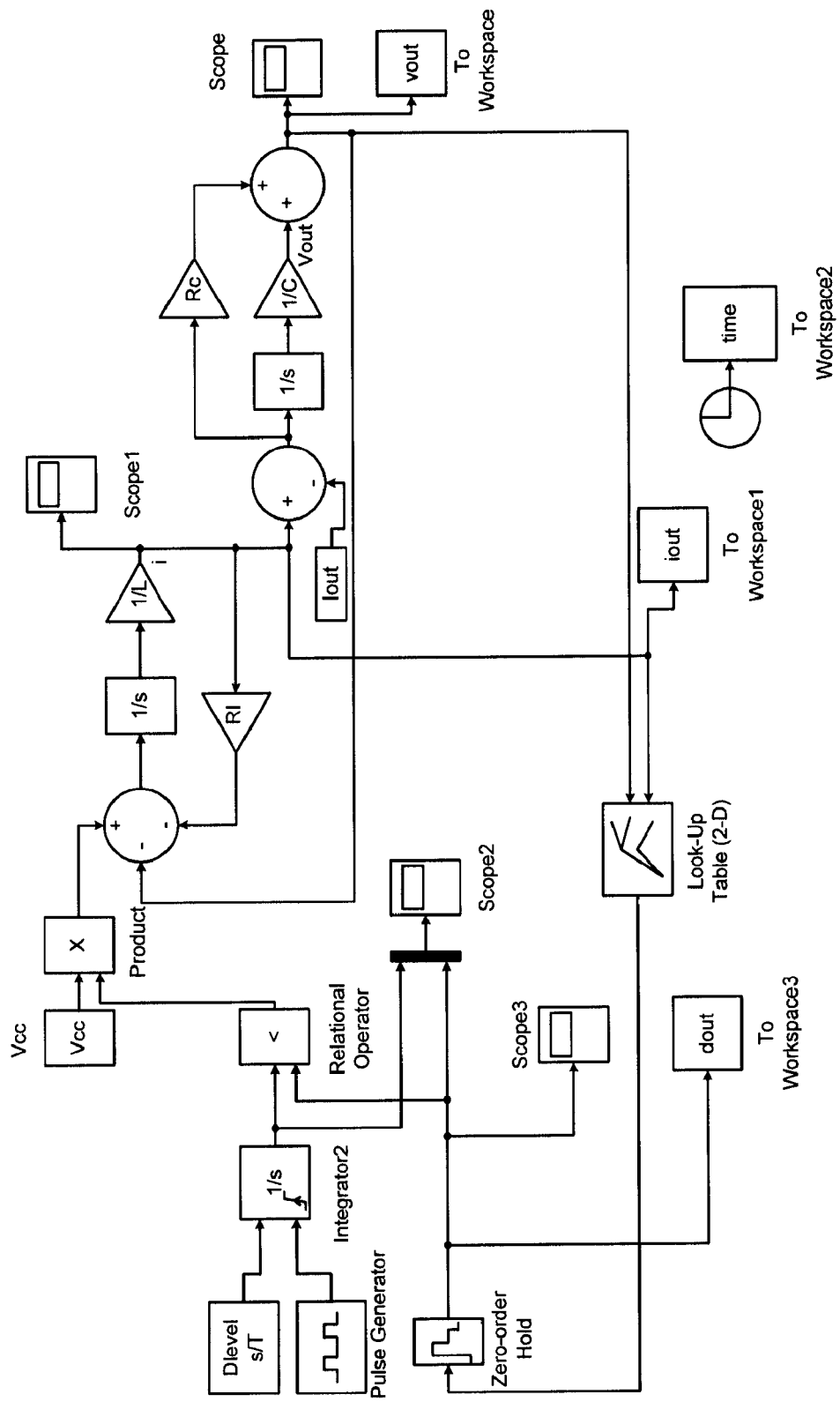
FIG. 6 shows the block diagram used in a simulation of an embodiment of the controller of these teachings.

This implementation of the embodiment of time-optimal controller described above is represented in a closed loop simulation of the buck converter. The simulation uses the block diagram shown in FIG. 6. The optimal controller is implemented as an interpolated lookup table based on the optimal control surface previously developed. A zero order hold is utilized to maintain the value of the lookup table as a constant across each PWM cycle.

This implementation of the above derived embodiment of the time-optimal controller of these teachings in a closed loop simulation of the buck converter is shown below. The simulation uses the block diagram shown in the following diagram. The optimal controller is implemented as an interpolated lookup table based on the optimal control surface previously developed. A zero order hold is utilized to maintain the value of the lookup table as a constant across each PWM cycle.

Figure 7A:
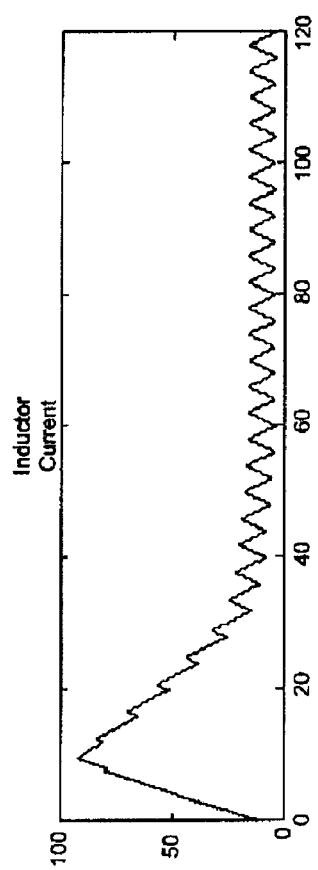
FIGS. 7a, 7b and 7c show a typical closed loop transient response for the above derived embodiment of the time-optimal controller of these teachings.
Figure 7B:
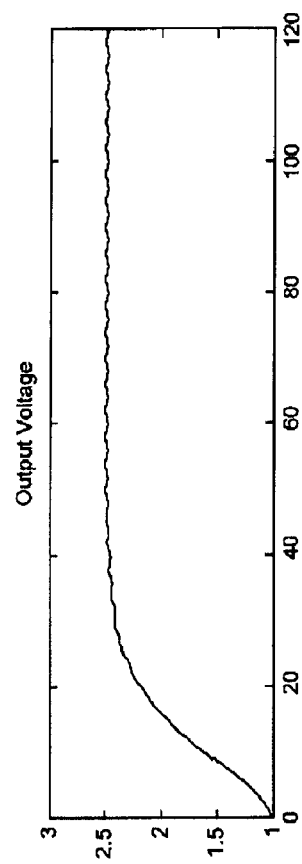
Figure 7C:
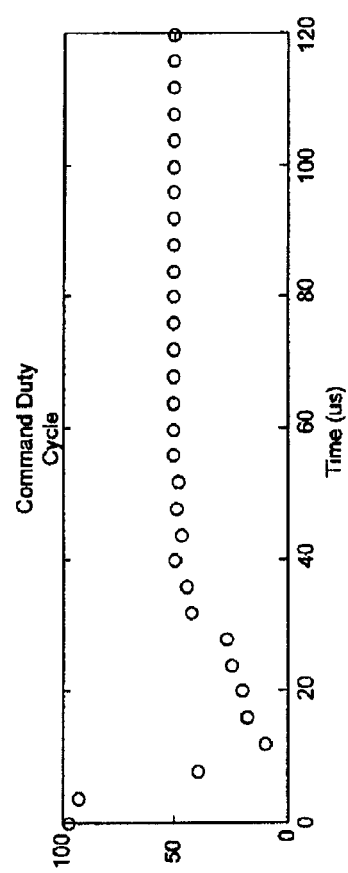

FIGS. 7a, 7b and 7c show a typical closed loop transient response for the above derived embodiment of the time-optimal controller of these teachings. In this case, the output voltage starts low. The characteristic response is a sharp increase in inductor current followed by a sharp decrease in inductor current. This current pulse provides the charge required to increase the output capacitor to its target value.

In another embodiment, the implementation of the nonlinear controller includes a component that implements another embodiment of the method for controlling a system described below. In that embodiment the method for controlling the system (a switching power supply is an exemplary embodiment) includes (a) predicting, utilizing a system model, values of system state variables at each of a predetermined number of time intervals; the system model receiving system state data at a predetermined initial time, (b) obtaining one value of the duty cycle at each of the predetermined number of time intervals; the one value being obtained from a predetermined polynomial function of at least one of the system state variables, (c) predicting system output at each of the predetermined number of time intervals; the system output being predicted utilizing the system model; the system model utilizing output from the control signal providing component at the each of the predetermined number of time intervals, the output at the each of the predetermined number of time intervals corresponding to the one value of the duty cycle at the each of the predetermined number of time intervals, (d) substantially minimizing a cost function; the cost function being a function of a difference of the predicted system output and a predetermined desired system output and of the one value of the duty cycle at the each of the predetermined number of time intervals, (e) obtaining, from substantially minimizing of the cost function, one substantially optimal duty cycle at the each of the predetermined number of time intervals, (f) providing, at a time interval from the predetermined number of time intervals subsequent to the predetermined initial time, the one substantially optimal duty cycle at the time interval to the pulse width modulator, (g) obtaining system state data at a time substantially equal to the sum of the predetermined initial time and time interval subsequent to the predetermined initial time, and repeating steps a) through g) for another predetermined time substantially equal to the sum of the predetermined initial time and time interval subsequent to the predetermined initial time. In one instance, the implementation of the nonlinear controller includes one or more processors and a computer-usable medium having computer-readable code embodied therein that causes the one or more processors to execute the embodiment of the method of these teachings described above.

In one instance, the polynomial function shown in FIG. 1h is utilized in the methods described above. In that instance, In one exemplary embodiment, these teachings not being limited to only that exemplary embodiment, the duty cycle is given by $Kv*Vc+Kv2*Vc^2+Kv3*Vc^3+Ki*ind+Ki2*ind^2+Ki3*ind^3.$ In another exemplary embodiment, these teachings not being limited to only that exemplary embodiment, the duty cycle is given by $Kv*Vc+Kv2*sign(Vc)*Vc^2+Kv3*Vc^3+Ki*ind+Ki2*sign(ind)*ind^2+Ki3*ind^3.$ In another exemplary embodiment, these teachings not being limited to only that exemplary embodiment, the duty cycle is limited to the maximum control effort. In that embodiment their duty cycle is given by $Kv*Vc+Kv2*sign(Vc)*Vc^2+Kv3*Vc^3+Ki*ind+Ki2*sign(ind)*ind^2+Ki3*ind^3.$ If the value of the expression is greater or equal to zero and is less than or equal to 100% duty cycle, then the duty cycle is assigned the value of the expression. If the value of the expression is less than zero, the duty cycle is assigned to zero. If the value of the expression is greater than 100%, the duty cycle is assigned to 100%.

It should be noted that although the above disclosed polynomial functions do not include cross terms (of the form Vc times ind and other powers of the cross variables), the present teachings are not limited to only those embodiments.

In one instance, the cost function is a weighted RMS output voltage error and, in one instance, the constrained quadratic programming problem is solved in order to substantially minimize the value of the cost function.

In utilizing the above described embodiment of the controller of these teachings, the switching power supply includes a circuit comprising at least two reactive components configured to provide an output voltage and capable of being switched from one output state to another output state, a switching component capable of switching the circuit between at least two switching states, the at least two switching states including the one output state and the other voltage state, a pulse width modulator capable of receiving a duty cycle and of driving the switching component in order to cause switching between two of the at least two switching states, and the embodiment of the nonlinear controller of these teachings.

In another instance, the above embodiment of a controlled switching power supply can include a state estimation component capable of receiving an output voltage and an input to a switching power supply and of providing an estimate of states in a state model of the switching power supply. Estimators described above and in the references cited above may be used, although these teachings are not limited to only those estimators.

In an exemplary application, the present teachings are applied to a nonlinear buck converter control problem. In that instance, a control law based on looking ahead several samples (PWM half cycles) is formulated and the required duty cycle is optimize. The above described steps of the embodiment of the method of these teachings can be re-expressed as:

1) Obtaining a model of the buck converter that uses the next N duty cycle inputs and the current state (voltage and current) to predict the output voltage error for the next N PWM half cycles.
2) Solving the constrained quadratic programming problem to minimize the weighted RMS output voltage error for the next N sample.
3) Implementing a feedback controller using the next duty cycle from the N duty cycle list
4) Measuring the resulting state (output voltage and current), and
5) Repeating steps 1 through 4 using the measured state as the new current state.

Figure 8A:
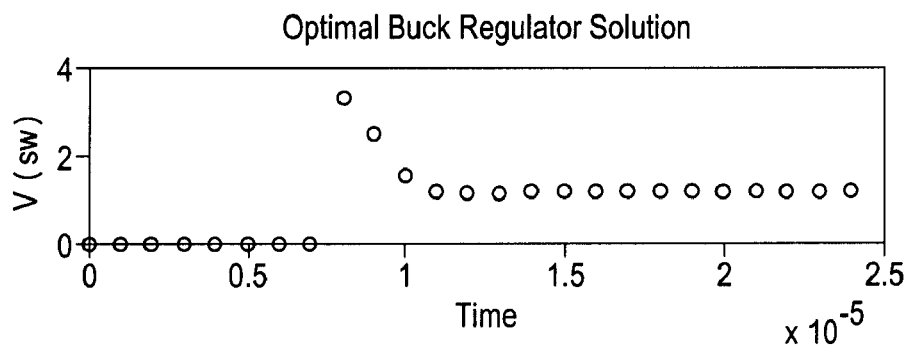
FIGS. 8a, 8b, and 8c show exemplary results from a nonlinear buck control program utilizing the present teachings.
Figure 8B:
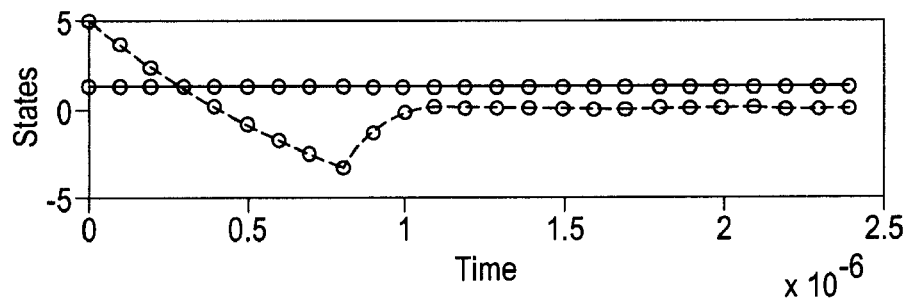
Figure 8C:
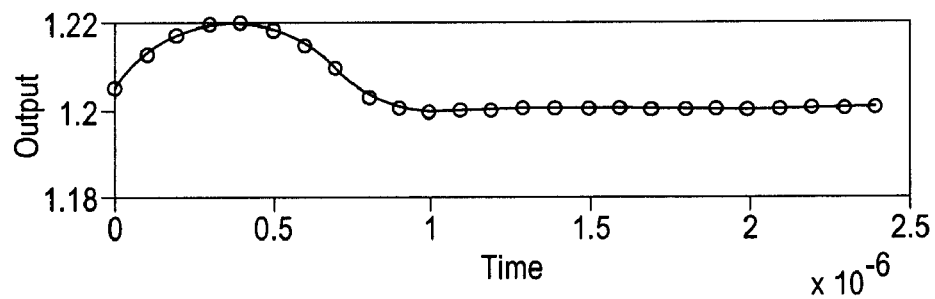

The polynomial approximation to the next duty cycle versus present state (capacitor voltage, inductor current) is utilized in the above implementation. Exemplary results for the nonlinear buck converter control problem are shown in FIGS. 8a through 8c.

Although the invention has been described with respect to various embodiments, it should be realized these teachings are also capable of a wide variety of further and other embodiments within the spirit and scope of the appended claims.

What is claimed is:

1. A switching power supply comprising:
a circuit comprising at least two reactive components configured to provide an output voltage and to switch from a first output state to a second output state;
a switching component configured to switch said circuit between at least two switching states, wherein said at least two switching states comprise said first output state and said second output state;
a pulse width modulator configured to receive a duty cycle and to drive said switching component to cause switching between two of said at least two switching states; and
a nonlinear controller component configured to provide a duty cycle to said pulse width modulator, wherein said duty cycle corresponds to at least one predetermined switching power supply state variable,
wherein said nonlinear controller component comprises a processor to:
apply an optimization technique to minimize a predetermined function of the duty cycle and internal states of the switching power supply; and
obtain, by applying the optimization technique, a relationship between the duty cycle and at least one predetermined switching power supply state variable.

2. The switching power supply of claim 1 further comprising a state estimator component configured to receive said output voltage and an input to said switching power supply and to provide an estimate of states in a state model of the switching power supply.

3. The switching power supply of claim 2 further comprising an output variables predictor receiving an estimate of at least one present output variable from said state estimator component, wherein said output variables predictor is configured to predict at least one future output variables value.

4. The switching power supply of claim 3 wherein said output variables predictor comprises a digital filter.

5. The switching power supply of claim 4 wherein said digital filter is a finite impulse response filter.

6. The switching power supply of claim 4 wherein said digital filter is an infinite impulse response filter.

7. The switching power supply of claim 4 wherein filter coefficients of said digital filter are determined by a least means squared (LMS) type algorithm.

8. The switching power supply of claim 4 wherein filter coefficients of said digital filter are determined by a recursive least squares (RLS) type algorithm.

9. The switching power supply of claim 3 wherein said output variables predictor receives an input signal indicating future occurrence of a change in load, and wherein said output variables predictor is configured to predict said at least one future output variable value after occurrence of said change in load.

10. The switching power supply of claim 9 wherein said output variables predictor utilizes a nonlinear lookup table.

11. The switching power supply of claim 10 wherein said nonlinear lookup table is implemented by means of a neural network.

12. The switching power supply of claim 1 wherein said nonlinear controller component comprises a memory for access by an application component, wherein said memory comprises a data structure stored said memory, wherein said data structure comprises a plurality of duty cycles, wherein each duty cycle in said plurality of duty cycles has a corresponding at least one predetermined switching power supply state variable, and wherein said each duty cycle, when provided to the pulse width modulator, enables obtaining a predetermined switching power supply output.

13. The switching power supply of claim 1 wherein said optimization technique is dynamic programming.

14. The switching power supply of claim 1 wherein said optimization technique is selected from a group consisting of model predictive control, genetic programming, simulated annealing, exhaustive numerical search, and neural networks.

15. The switching power supply of claim 1 wherein said nonlinear controller component comprises a plurality of comparators, wherein said plurality of comparators is operatively connected to provide a piecewise linear approximation to a relationship between said duty cycle and at least one predetermined switching power supply state variable.

16. The switching power supply of claim 1 wherein said nonlinear controller component comprises a component for obtaining a value of said duty cycle by evaluating a predetermined polynomial function of at least one switching power supply state variable at a predetermined value of said at least one switching power supply state variable, wherein said value of said duty cycle corresponds to said predetermined value of said at least one switching power supply variable, and wherein said value of said duty cycle, when provided to the pulse width modulator enables obtaining a predetermined switching power supply output.

17. The switching power supply of claim 1 wherein said nonlinear controller component comprises a memory for access by an application component, wherein said memory comprises coefficients of a predetermined polynomial function.

18. The switching power supply of claim 1 wherein, said processor estimates switching power supply state data from switching power supply output and switching power supply input.

19. The switching power supply of claim 1, wherein said nonlinear controller component is operatively connected to receive as inputs said at least one predetermined switching power supply state variable, and wherein said processor is configured to execute instructions to:
 a) predict, utilizing a switching power supply model, values of switching power supply state variables at each of a predetermined number of time intervals from a plurality of time intervals, wherein said switching power supply model receives switching power supply state data at a predetermined initial time;
 b) obtain one value of said duty cycle at said each of said predetermined number of time intervals, wherein said one value is obtained from a predetermined polynomial function of at least one of said switching power supply state variables;
 c) predict switching power supply output at said each of said predetermined number of time intervals, wherein said switching power supply output is predicted utilizing said switching power supply model, wherein said switching power supply model utilizes output from said pulse width modulator at said each of said predetermined number of time intervals, and wherein said output at said each of said predetermined number of time intervals corresponds to said one value of said duty cycle at said each of said predetermined number of time intervals;
 d) minimize a cost function, wherein said cost function is a function of a difference of said predicted switching power supply output and a predetermined desired switching power supply output and of said one value of said duty cycle at said each of said predetermined number of time intervals;
 e) obtain, from said minimizing of said cost function, one optimal duty cycle at said each of said predetermined number of time intervals;
 f) provide, at a time interval from said predetermined number of time intervals subsequent to said predetermined initial time, said one optimal duty cycle at said time interval to said pulse width modulator;
 g) obtain switching power supply state data at a time equal to a sum of said predetermined initial time and time interval subsequent to said predetermined initial time; and
 h) repeat steps a) through g) for another predetermined time equal to said sum of said predetermined initial time and time interval subsequent to said predetermined initial time.

* * * * *

UNITED STATES PATENT AND TRADEMARK OFFICE
CERTIFICATE OF CORRECTION

| | | |
|---|---|---|
| PATENT NO. | : 8,866,463 B2 | Page 1 of 1 |
| APPLICATION NO. | : 13/750564 | |
| DATED | : October 21, 2014 | |
| INVENTOR(S) | : Paul W. Latham, II et al. | |

It is certified that error appears in the above-identified patent and that said Letters Patent is hereby corrected as shown below:

In the Claims:

Column 14, Line 31, Claim 7    Delete "means squared" and insert --mean squares--

Signed and Sealed this
Twelfth Day of May, 2015

Michelle K. Lee
*Director of the United States Patent and Trademark Office*